US012215300B2

(12) United States Patent
Herzog

(10) Patent No.: US 12,215,300 B2
(45) Date of Patent: Feb. 4, 2025

(54) COMPOSITION FOR CLEANING SURFACES

(71) Applicant: Thonhauser GmbH, Giesshuebl (AT)

(72) Inventor: Daniel Herzog, Purkersdorf (AT)

(73) Assignee: Thonhauser GmbH, Giesshuebl (AT)

( * ) Notice: Subject to any disclaimer, the term of this patent is extended or adjusted under 35 U.S.C. 154(b) by 561 days.

(21) Appl. No.: 16/607,478

(22) PCT Filed: Apr. 27, 2018

(86) PCT No.: PCT/AT2018/060086

§ 371 (c)(1),
(2) Date: Oct. 23, 2019

(87) PCT Pub. No.: WO2018/195577

PCT Pub. Date: Nov. 1, 2018

(65) Prior Publication Data

US 2020/0140783 A1 May 7, 2020

(30) Foreign Application Priority Data

Apr. 29, 2017 (AT) .............................. A 50350/2017

(51) Int. Cl.
*C11D 3/04* (2006.01)
*C11D 3/36* (2006.01)
*C11D 3/39* (2006.01)
*C11D 17/00* (2006.01)

(52) U.S. Cl.
CPC .............. *C11D 3/046* (2013.01); *C11D 3/044* (2013.01); *C11D 3/361* (2013.01); *C11D 3/364* (2013.01); *C11D 3/365* (2013.01); *C11D 3/3942* (2013.01); *C11D 17/0008* (2013.01); *C11D 2111/14* (2024.01)

(58) Field of Classification Search
CPC ......... C11D 3/046; C11D 3/044; C11D 3/361; C11D 3/364; C11D 3/365; C11D 3/3942; C11D 11/0023; C11D 17/0008; C11D 3/3937; C11D 17/041; C11D 1/342
See application file for complete search history.

(56) References Cited

U.S. PATENT DOCUMENTS

| | | | | |
|---|---|---|---|---|
| 3,286,475 | A * | 11/1966 | Adams | C09K 17/48 405/264 |
| 6,140,299 | A | 10/2000 | Eriksson | |
| 7,737,101 | B2 | 6/2010 | Thonhauser et al. | |
| 8,021,493 | B2 * | 9/2011 | Smith | C11D 3/10 134/42 |
| 8,568,613 | B2 * | 10/2013 | Man | A61P 17/00 252/186.25 |
| 9,765,284 | B2 * | 9/2017 | Man | C11D 3/10 |
| 2005/0011830 | A1 | 1/2005 | Lessard | |
| 2005/0113541 | A1 * | 5/2005 | Tsumori | C08F 290/062 526/217 |
| 2007/0102665 | A1 | 5/2007 | Thonhauser | |
| 2009/0197790 | A1 * | 8/2009 | Sengupta | C11D 3/0094 510/435 |
| 2011/0081299 | A1 | 4/2011 | Thonhauser | |
| 2013/0224308 | A1 * | 8/2013 | De Windt | B08B 7/0014 252/186.1 |
| 2014/0021401 | A1 | 1/2014 | Jiang et al. | |

FOREIGN PATENT DOCUMENTS

| | | | |
|---|---|---|---|
| CN | 1227346 | C | 11/2005 |
| CN | 102180540 | A | 9/2011 |
| EP | 0 313 145 | A2 | 4/1989 |
| EP | 2 450 114 | A1 | 5/2012 |
| WO | 02/31098 | A1 | 4/2002 |
| WO | 2005044968 | A1 | 5/2005 |
| WO | 2008112657 | A1 | 9/2008 |

OTHER PUBLICATIONS

Etidronic acid (common name of claim 3) MSDS 9 pages, file:///C:/Users/pkumar/Documents/e-Red%20Folder/16607478/organic%20phosphonate%20claim%203%20MSDS.pdf (Year: 2021).*
Dequest FS0536N Msds (Year: 2021).*
English Translation of International Search Report for PCT/AT2018/060086, dated Jul. 24, 2018 (3 pages).
English Translation of Written Opinion for PCT/AT2018/060086, dated Jul. 24, 2018 (5 pages).

* cited by examiner

*Primary Examiner* — Angela C Brown-Pettigrew
*Assistant Examiner* — Preeti Kumar
(74) *Attorney, Agent, or Firm* — Thrive IP®; Jeremy M. Stipkala

(57) ABSTRACT

The present invention relates to a composition for cleaning surfaces and/or for detecting organic substances in a solution or on a surface, comprising a) at least one salt of the permanganic acid, ferric acid and/or chromic acid,
b) at least one organic phosphonate and
c) at least one persulphate, wherein the at least one organic phosphonate has a general formula (I)

(I)

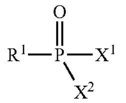

wherein $R^1$ is an organic moiety, $X^1$ is OH or $OM_1$ and $X^2$ is OH or $OM_2$, wherein $M_1$ and $M_2$ represent an alkali metal ion or ammonium ion, wherein the organic moiety $R^1$ is a mono-substituted or multiple-substituted or unsubstituted $C_1$-$C_{12}$ alkyl moiety, $C_3$-$C_{10}$ cycloalkyl moiety or $C_6$-$C_{14}$ aryl moiety, wherein the organic moiety may be attached to 1 to 3 further phosphonate groups of the general formula (I).

14 Claims, No Drawings

COMPOSITION FOR CLEANING SURFACES

The present invention relates to compositions for cleaning surfaces and/or for detecting organic substances in a solution or on a surface.

Cleaning and disinfecting surfaces is of great importance, among others, in the field of food manufacturing and drug production. Especially devices, which contact foodstuff and drugs or the starting products thereof, respectively, during the production process, have to be subjected to a thorough cleaning and disinfection on a regular basis. In many cleaning methods, cleaning solutions on the basis of alkali hydroxides or strongly oxidizing substances are being utilized. In order to examine the efficiency of a cleaning process, there are frequently used aqueous cleaning or detection solutions, which include an oxidizing agent, which upon reduction thereof with, for example, organic compounds is able to change the colour of the corresponding solutions. Due to the colour change conditioned by the reduction of the oxidizing agent, it is, hence, possible to determine whether organic compounds are present in a solution or on a surface. If there is no colour change, there may be assumed that no compounds reducing the oxidizing agent are present. As oxidizing agents, there are frequently used salts of the permanganic acid and in particular potassium permanganate (see WO 03/035812 and WO 2014/122277).

Many cleaning agents comprise phosphates in order to reduce the hardness of the water used for cleaning and to improve the cleaning process. As phosphates, however, may result in ecological problems, it is desirable to use other substances instead of phosphates.

It is, hence, an object of the present invention to provide a composition, which is, among others, suited to clean surfaces and which does not include any phosphates.

The present invention thus relates to a composition for cleaning surfaces and/or for detecting organic substances in a solution or on a surface, comprising a) at least one salt of the permanganic acid, ferric acid and/or chromic acid, b) at least one organic phosphonate and c) at least one persulphate, wherein the at least one organic phosphonate has a general formula (I)

(I)

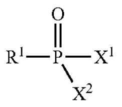

wherein $R^1$ is an organic moiety, $X^1$ is OH or $OM_1$ and $X^2$ is OH or $OM_2$, wherein $M_1$ and $M_2$ represent an alkali metal ion or ammonium ion, wherein the organic moiety $R^1$ is a mono-substituted or multiple-substituted or unsubstituted $C_1$-$C_{12}$ alkyl moiety, $C_3$-$C_{10}$ cycloalkyl moiety or $C_6$-$C_{14}$ aryl moiety, wherein the organic moiety may be attached to 1 to 3 further phosphonate groups of the general formula (I).

It has surprisingly been shown that organic phosphonates as defined above may be used instead of phosphates in cleaning agents. The organic phosphonates used according to the invention are in particular characterized by being able to significantly increase the stability and, hence, the storability of the salts of the permanganic acid, ferric acid and chromic acid present therein. This is, among others, surprising as salts of the acids mentioned previously are—as strong oxidizing agents—able to oxidize organic compounds, on the one hand. Furthermore, it has been shown that organic phosphonates, the organic moieties of which comprise heteroalkyl, heterocycloalkyl or heteroaryl moieties, do not give rise to a stable composition in regard to the salts of the permanganic acid, ferric acid and/or chromic acid being present in the composition. This means that organic phosphonates, which comprise heteroalkyl, heterocycloalkyl or heteroaryl moieties, are not suited to be used in a composition according to the invention, as in this way the salts of the permanganic acid, ferric acid and chromic acid will be surprisingly destabilized, such that these may not be used as colour indicators for the detection of organic compounds anymore. In the case of such undesired organic phosphonates not according to the invention, this would lead to an undesired colour change of the composition, whereby this will no longer be suitable to detect organic substances by means of colour change, as, e.g., described in WO 03/035812. Surprisingly, organic phosphonates of the type initially defined show to have a stabilizing and no destabilizing effect on the salts of the permanganic acid, ferric acid and chromic acid. The organic phosphonates according to the invention, hence, comprise exclusively homoalkyl, homocycloalkyl and homoaryl moieties, i.e. these moieties do not have, neither in the chain nor in the ring, respectively, an O, S or N atom instead of C atoms.

There was surprisingly found in experiments that organic phosphonates such as amino-tris(methylene phosphonic acid) (ATMP), diethylene triamine penta(methylene phosphonic acid) (DTPMP) and ethylene diamine tetra(methylene phosphonic acid) (EDTMP), comprising heteroalkyls, lead to a rapid reduction of the salts of the permanganic acid, ferric acid and chromic acid, whereas HEDP and PBTC, both having no heteroalkyls, do not present these properties. An organic phosphonate is then suitable for the inventive purpose if this reacts within 30 minutes at room temperature (40° C.) at the most 30%, preferably at the most 25%, even more preferably at the most 20%, of Mn(VII) (in permanganate) into Mn(VI). This reaction may, for example, be measured at an absorption of 425 nm (absorption maximum of Mn (VI)). If the reduction of the salts of the permanganic acid, ferric acid and chromic acid is faster, then the respective compositions may only in a limited way be used for the determination of organic compounds in a sample, as it is thus not possible to determine whether the reduction of the salts has actually its origin in the sample to be examined.

The composition according to the invention may comprise several different salts of the permanganic acid, ferric acid and chromic acid, wherein the composition may include salts having the same anion and different cations and/or salts having different anions and the same cation. Salts of the permanganic acid, ferric acid and chromic acid preferably comprise the anions $MnO_4^-$, $FeO_4^{2-}$ or $CrO_4^{2-}$, respectively, wherein the cations are preferably metal ions, in particular alkali metal ions. The composition according to the invention preferably includes thus at least two, even more preferably at least three, even more preferably at least five salts of the permanganic acid, ferric acid and/or chromic acid.

Salts of the permanganic acid, ferric acid and chromic acid are well-known oxidizing agents. The composition according to the invention may comprise, apart from these oxidizing agents, preferably at least two, even more preferably at least three, even more preferably at least four further oxidizing agents. This means that these further oxidizing agents are no salts of the permanganic acid, ferric acid and chromic acid.

The composition according to the invention comprises at least one, preferably at least two, even more preferably at least three, even more preferably at least four organic phosphonates. "Phosphonates" are organic compounds ("organic phosphonates") of the phosphonic acid ($H_3PO_3$). An "organic phosphonate" according to the invention has the general formula (I)

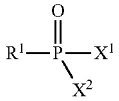

wherein $R^1$ is an organic moiety, $X^1$ is OH or $OM_1$ and $X^2$ is OH or $OM_2$, wherein $M_1$ and $M_2$ represent an alkali metal ion or ammonium ion. The organic moiety $R^1$ may be a substituted or unsubstituted $C_1$-$C_{12}$ alkyl moiety, $C_3$-$C_{10}$ cycloalkyl moiety or $C_6$-$C_{14}$ aryl moiety, wherein the organic moiety may be attached to 1 to 3 further phosphonate groups of the general formula (I).

Organic phosphonate compounds may have the general structure of $R—PO(OH)_2$, wherein R may be an alkyl or aryl moiety or any other organic moiety. If a phosphonate comprises more than one of these organic phosphonates, this will be called bisphosphonates or polyphosphonates. Organic phosphonates may be acids, or they may be present as salts, preferably as alkali metal salts.

The composition according to the invention, which may present in a solid form or as an aqueous solution, due to the presence of the oxidizing agents therein, is suitable for the cleaning and disinfection of surfaces, in particular of metallic, ceramic or glass surfaces, which are substantially resistant to oxidizing agents. According to a preferred embodiment of the present invention, the metallic surfaces to be cleaned comprise or are composed of, respectively, stainless steel and/or inert metals (such as, e.g., platinum, gold) or metal alloys, wherein surfaces composed of or comprise stainless steel are in particular preferred, as these are commonly used in the production plants of the pharmaceutical industry and in the food manufacturing (including also the beverage manufacturing such as wine and beer production). Pipes and containers of any type are in particular preferably cleaned or disinfected, respectively, using the composition according to the invention. Accordingly, a surface may be any form or type of any object.

Using the composition according to the invention, contaminations of any type may be removed from a surface. Preferably, common contaminations in the foodstuff industry (e.g., fat and protein deposits, burned-in food) and the pharmaceutical industry (e.g., residues from the production of drugs) are being cleaned. Apart from the use for cleaning surfaces, the composition according to the invention may also be used for the disinfection of surfaces. Thereby, cells of any type, in particular microorganisms such as bacteria, archaea, fungi, algae and protozoa, but also animal, human and plant cells are destroyed or at least damaged to the extent such that these are no longer viable. Furthermore, using the composition according to the invention, also viruses may be rendered non-hazardous.

The composition according to the invention may be used either batch-wise (i.e. discontinuously) or continuously (e.g., by passing the aqueous cleaning solution according to the invention through the pipes and containers to be cleaned). The composition according to the invention is especially preferably used within the scope of a CIP method ("cleaning in place" method, place bound cleaning method). CIP methods in general include several method steps such as (1) pre-flushing in order to remove coarse contaminations, (2) cleaning using an alkaline agent (most frequently an alkali hydroxide), (3) removing the cleaning agent by flushing with water, (4) optional acid treatment in order to remove lime scale, (5) optionally removing the acid using water, and (6) disinfection. At least step (2) of a CIP method is always carried out at temperatures of at least 70° C. in order to enable an efficient cleaning of the alkaline agent.

According to a preferred embodiment of the present invention, the $C_1$-$C_{12}$ alkyl moiety, $C_3$-$C_{10}$ cycloalkyl moiety or $C_6$-$C_{14}$ aryl moiety is substituted with a $C_1$-$C_6$ alkyl moiety and/or an OH moiety.

The organic phosphonates used according to the invention may comprise substituted or non-substituted $C_1$-$C_{12}$ alkyl moieties, $C_3$-$C_{10}$ cycloalkyl moieties or $C_6$-$C_{14}$ aryl moieties. These moieties are especially preferably substituted with a $C_1$-$C_6$ alkyl moiety and/or an OH moiety.

According to a further preferred embodiment of the present invention, the at least one organic phosphonate is selected from the group consisting of 1-hydroxy ethane-(1,1-diphosphonic acid) (HEDP), 2-phosphono butane-1,2,4-tricarboxylic acid (PBTC) and a salt thereof, preferably an alkali salt (sodium, potassium or lithium salt) or an ammonium salt.

According to a preferred embodiment of the present invention, the at least one of salt of the permanganic acid, ferric acid and/or chromic acid is an alkali salt, preferably selected from the group consisting of potassium permanganate, potassium ferrate and potassium dichromate, wherein especially preferably the composition according to the invention comprises potassium permanganate "Persulphates" are salts of the peroxo-disulphuric acid $H_2S_2O_8$ or of the peroxo-monosulphuric acid $H_2SO_5$ and have a high oxidation potential. Persulphates are, hence, very well suited to clean and/or disinfect surfaces.

According to an especially preferred embodiment of the present invention, the at least one persulphate is a salt of the peroxo-disulphuric acid or of the peroxo-monosulphuric acid.

According to a further preferred embodiment of the present invention, the at least one persulphate is a peroxo-disulphate, selected from the group consisting of sodium peroxo-disulphate, potassium peroxo-disulphate and ammonium peroxo-disulphate, and/or a peroxo-monosulphate, selected from the group consisting of potassium peroxo-monosulphate.

According to an especially preferred embodiment of the present invention, the composition includes at least one calcium salt, which is preferably selected from the group consisting of calcium nitrate.

The composition according to the invention comprises the at least one salt of the permanganic acid, ferric acid and/or chromic acid at a weight ratio to the at least one organic phosphonate preferably of 1:50 to 1:500, preferably of 1:75 to 1:300, even more preferably of 1:100 to 1:200.

The composition according to the invention may be provided substantially free of water but also in an aqueous form.

According to a preferred embodiment of the present invention, the composition is an aqueous composition. Thereby, the composition includes added water, wherein the aqueous composition is preferably prepared by water being provided and the individual components being added.

According to a further preferred embodiment of the present invention, the aqueous composition comprises more than 30% by weight, preferably more than 40% by weight, even more preferably more than 50% by weight, even more preferably more than 60% by weight, even more preferably more than 70% by weight, even more preferably more than 75% by weight, even more preferably more than 80% by weight, even more preferably more than 85% by weight, even more preferably more than 90% by weight, water.

"% by weight" as used herein means "weight percent".

Providing the composition according to the invention as an aqueous composition has the advantage that this may be used directly and immediately for the cleaning/disinfection of surfaces or for detecting organic/biological contaminations.

If the composition according to the invention comprises a lower water proportion (e.g., less than 60%, preferably less than 50%, even more preferably less than 40%, even more preferably less than 30%), then this may be used as a concentrate, which is diluted before use with water or other cleaning solutions, comprising, for example, alkali hydroxides (e.g., NaOH, KOH).

According to an especially preferred embodiment of the present invention, the aqueous solution comprises 0.1% by weight to 2% by weight, preferably 0.2% by weight to 1.5% by weight, even more preferably 0.3% by weight to 1% by weight, even more preferably 0.4% by weight to 0.8% by weight, even more preferably 0.4% by weight to 0.6% by weight, even more preferably 0.5% by weight, of the at least one further oxidizing agent.

The aqueous composition comprises preferably 0.01% by weight to 1% by weight, preferably 0.02% by weight to 0.9% by weight, even more preferably 0.05% by weight to 0.8% by weight, even more preferably 0.075% by weight to 0.7% by weight, even more preferably 0.1% by weight to 0.6% by weight, even more preferably 0.2% by weight to 0.6% by weight, even more preferably 0.3% by weight to 0.6% by weight, of the at least one organic phosphonate.

According to a further preferred embodiment of the present invention, the aqueous composition comprises 0.1% by weight to 3% by weight, preferably 0.2% by weight to 2% by weight, more preferably 0.3 to 1% by weight, of the at least one calcium salt.

According to a preferred embodiment of the present invention, the composition is substantially free of water.

"Substantially free of water" as used herein means that the composition according to the invention does not comprise more than 10% by weight, preferably not more than 5% by weight hydrate water and/or constitution water.

According to an especially preferred embodiment of the present invention, the composition comprises less than 20% by weight, preferably less than 10% by weight, even more preferably less than 5% by weight, even more preferably less than 1% by weight, water.

According to a further preferred embodiment of the present invention, the composition comprises at least one alkali hydroxide.

In order to increase the cleaning effect of the composition according to the invention, it comprises at least one alkali hydroxide. Alkali hydroxides are frequently used for cleaning surfaces, as, on the one side, the negatively charged hydroxide ions attach to dirt as well as to the surface to be cleaned, leading to an electrostatic rejection of the dirt, and, on the other side, oils and fats are converted into water-soluble soaps in the presence of hydroxides in an alkaline hydrolysis.

"Alkali hydroxides", also called "alkali metal hydroxides", are hydroxides of the alkali metals and have the general formula MeOH (Me—alkali metal). "Alkali hydroxides" easily dissolve in water under strong heating, forming strongly alkaline solutions.

According to an especially preferred embodiment of the present invention, the at least one alkali hydroxide comprises NaOH, KOH or LiOH, wherein there are especially preferably used NaOH or KOH.

The aqueous composition comprises preferably 0.1% by weight to 5% by weight, preferably 0.2% by weight to 3% by weight, even more preferably 0.3% by weight to 1.5% by weight, even more preferably 0.4% by weight to 1% by weight, even more preferably 0.4% by weight to 0.8% by weight, even more preferably 0.5% by weight, of the at least alkali hydroxide.

Another aspect of the present invention relates to a kit for cleaning surfaces and/or for detecting organic substances in a solution or on a surface, comprising a1) a container comprising a composition according to the invention and b1) a container comprising at least one alkali hydroxide or a2) a container comprising at least one alkali salt according to the invention of the permanganic acid, ferric acid and/or chromic acid, b2) a container comprising at least one organic phosphonate according to the invention and optionally at least one persulphate and c2) a container comprising at least one alkali hydroxide.

The composition according to the invention may also be part of a kit, which may be used for cleaning surfaces and/or for detecting organic substances in a solution or on a surface. Apart from the composition according to the invention, the kit comprises a container, which contains at least one alkali hydroxide, either in an aqueous solution or substantially free of water, as herein defined. The content or the respective proportions of the content of the two containers may be blended, mixed and/or provided with water before use.

According to a preferred embodiment of the present invention, the at least one alkali hydroxide is NaOH, KOH or LiOH.

Still a further aspect of the present invention relates to a method for cleaning surfaces and/or for detecting organic substances in a solution or on a surface, comprising the step of contacting a composition according to the invention or a composition obtainable by mixing the components in the containers a1 and b1 or a2, b2 and b3 of the kit according to the invention with the surface to be cleaned or with the surface or solution, on or in which the organic substances are to be detected.

The composition according to the invention may be used in methods for cleaning surfaces and/or for detecting organic substances in a solution or on a surface. Corresponding methods are well-known to those skilled in the art and include at least the steps of applying the composition according to the invention onto a surface to be cleaned and removing thereof following a common dwell time. Usually, the surface is then flushed with water in order to remove residues of the composition according to the invention and any still present dirt residues.

Another aspect of the present invention relates to the use of an organic phosphonate for the stabilization of a salt of the permanganic acid, ferric acid and/or chromic acid in a composition, preferably in an aqueous composition.

A substantial aspect of the present invention is the use of organic phosphonates for the stabilization of salts of the permanganic acid, ferric acid and chromic acid preferably in aqueous solutions. It has surprisingly been shown that organic phosphonates are able to stabilize such salts. This aspect of the invention is not only relevant for cleaning surfaces and detecting organic substances in a solution or on a surface but rather also in other cases, wherein stabile aqueous solutions, including salts of the permanganic acid, ferric acid and chromic acid, are required.

The present invention is explained in greater detail by way of the following examples, without being limited thereto.

EXAMPLES

Example 1

Stability of Potassium Permanganate Containing Compositions

Compositions and Experimental Design:

In order to investigate the stability of permanganate in potassium manganate containing compositions, there were prepared various compositions:

Composition A:
- 0.04 g potassium permanganate
- 2 g 1-hydroxyethane-(1,1-diphosphonic acid) (HEDP)
- 996.4 g water Composition B:
- 0.04 g potassium permanganate
- 2 g 2-phosphono-butane-1,2,4-tricarboxylic acid (PBTC)
- 996.4 g water Composition C:
- 0.04 g potassium permanganate
- 2 amino-tris (methylene phosphonic acid) (ATMP)
- 996.4 g water Composition D:
- 0.04 g potassium permanganate
- 2 g diethylene triamine penta (methylene phosphonic acid) (DTPMP)
- 996.4 g water Composition E:
- 0.04 g potassium permanganate
- 2 g ethylene diamine tetra (methylene phosphonic acid) (EDTMP)
- 996.4 g water Composition F:
- 0.04 g potassium permanganate
- 2 g 1-hydroxyethane-(1,1-diphosphonic acid) (HEDP)
- 5 g NaOH
- 991.4 g water Composition G:
- 0.04 g potassium permanganate
- 2 g 2-phosphono butane-1,2,4-tricarboxylic acid (PBTC)
- 5 g NaOH
- 991.4 g water Composition H:
- 0.04 g potassium permanganate
- 2 amino-tris (methylene phosphonic acid) (ATMP)
- 5 g NaOH
- 991.4 g water Composition I:
- 0.04 g potassium permanganate
- 2 g diethylene triamine penta (methylene phosphonic acid) (DTPMP)
- 5 g NaOH
- 991.4 g water Composition J:
- 0.04 g potassium permanganate
- 2 g ethylene diamine tetra (methylene phosphonic acid) (EDTMP)
- 5 g NaOH
- 991.4 g water Composition K:
- 0.04 g potassium permanganate
- 2 g 1-hydroxyethane-(1,1-diphosphonic acid) (HEDP)
- 5 g NaOH
- 5 g sodium peroxo-disulphate
- 986.4 g water Composition L:
- 0.04 g potassium permanganate
- 2 g 2-phosphono-butane-1,2,4-tricarboxylic acid (PBTC)
- 5 g NaOH
- 5 g sodium peroxo-disulphate
- 986.4 g water Composition M:
- 0.04 g potassium permanganate
- 2 amino-tris (methylene phosphonic acid) (ATMP)
- 5 g NaOH
- 5 g sodium peroxo-disulphate
- 986.4 g water Composition N:
- 0.04 g potassium permanganate
- 2 g diethylene triamine penta (methylene phosphonic acid) (DTPMP)
- 5 g NaOH
- 5 g sodium peroxo-disulphate
- 986.4 g water Composition O:
- 0.04 g potassium permanganate
- 2 g ethylene diamine tetra (methylene phosphonic acid) (EDTMP)
- 5 g NaOH
- 5 g sodium peroxo-disulphate
- 986.4 g water Comparative Composition 1:
- 0.04 g potassium permanganate
- 2 g 1-hydroxyethane-(1,1-diphosphonic acid) (HEDP)
- 5 g NaOH
- 5 g hydrogen peroxide
- 986.4 g water Comparative Composition 2:
- 0.04 g potassium permanganate
- 2 g 2-phosphono-butane-1,2,4-tricarboxylic acid (PBTC)
- 5 g NaOH
- 5 g hydrogen peroxide
- 986.4 g water Comparative Composition 3:
- 0.04 g potassium permanganate
- 2 amino-tris (methylene phosphonic acid) (ATMP)
- 5 g NaOH
- 5 g hydrogen peroxide
- 986.4 g water Comparative Composition 4:
- 0.04 g potassium permanganate
- 2 g diethylene triamine penta (methylene phosphonic acid) (DTPMP)
- 5 g NaOH
- 5 g hydrogen peroxide
- 986.4 g water Comparative Composition 5:
- 0.04 g potassium permanganate
- 2 g ethylene diamine tetra (methylene phosphonic acid) (EDTMP)
- 5 g NaOH
- 5 g hydrogen peroxide
- 986.4 g water The components of the compositions A to O and of the comparative compositions 1 to 5 were mixed and dissolved in water. Subsequently, the compositions were incubated at 40° C. for a total of 60 minutes in a closed vessel. Within the first 30 minutes, there was measured, respectively after 5 minutes of incubation, the absorption of the aqueous compositions at 425 nm and at 580 nm (absorption maximum of permanganate). The absorption decrease of the measured compositions at 580 nm shows the reduction of potassium permanganate in the solution. After 30 minutes, the measurement interval was extended to 10 minutes. The faster the decrease of the absorption of the compositions and, hence, the reduction of the potassium permanganate therein is realized, the more unsuitable are these to be used in the determination of the presence of organic compounds in samples. The absorption at minute 0 of each composition was set with 100%, with the result of the absorption measurements at the respective time points being correlated with those at minute 0.

Results:

TABLE A

Absorption of the compositions A to E at 580 nm, wherein the absorption values at minute 0 were set with 100% and the further measurement results of the examination were correlated accordingly (mean value of three independent measurements).

| Measurement time | Composition | | | | |
|---|---|---|---|---|---|
| point [min] | A | B | C | D | E |
| 0 | 100% | 100% | 100% | 100% | 100% |
| 5 | 98.7% | 99.1% | 91.9% | 93.5% | 92.2% |
| 10 | 95.3% | 97.2% | 82.2% | 87.0% | 85.1% |
| 15 | 93.1% | 94.7% | 70.7% | 72.2% | 69.3% |
| 20 | 91.9% | 92.8% | 63.1% | 62.8% | 63.6% |
| 25 | 87.1% | 87.9% | 55.8% | 53.7% | 56.8% |
| 30 | 85.0% | 84.3% | 50.2% | 48.3% | 47.9% |
| 40 | 82.6% | 82.1% | 41.0% | 42.4% | 41.5% |
| 50 | 81.1% | 80.3% | 35.9% | 36.8% | 37.1% |
| 60 | 79.9% | 78.1% | 31.2% | 30.9% | 29.3% |

As there were present alkali hydroxides in many cleaning solutions, which provide a more efficient cleaning, there was investigated whether the presence of NaOH has an impact on the reduction of potassium permanganate.

TABLE B

Absorption of the compositions F to J at 580 nm, wherein the absorption values at minute 0 were set with 100% and the further measurement results of the examination were correlated accordingly (mean value of three independent measurements).

| Measurement time | Composition | | | | |
|---|---|---|---|---|---|
| point [min] | F | G | H | I | J |
| 0 | 100% | 100% | 100% | 100% | 100% |
| 5 | 99.1% | 98.2% | 93.2% | 91.2% | 94.4% |
| 10 | 96.8% | 97.1% | 87.4% | 86.3% | 89.2% |
| 15 | 94.1% | 93.2% | 80.1% | 72.8% | 71.3% |
| 20 | 92.4% | 91.6% | 72.8% | 62.9% | 66.4% |
| 25 | 89.3% | 88.9% | 65.0% | 53.4% | 57.6% |
| 30 | 87.2% | 86.6% | 59.7% | 48.6% | 46.5% |
| 40 | 85.6% | 85.4% | 46.5% | 42.5% | 43.4% |
| 50 | 83.7% | 82.7% | 38.4% | 36.2% | 35.7% |
| 60 | 80.8% | 79.9% | 31.3% | 30.1% | 30.8% |

Cleaning solutions or compositions, respectively, may further include further oxidizing agents with inorganic peroxidases and persulphates. There was further analysed the impact of such oxidizing agents on the stability of potassium permanganate.

TABLE C

Absorption of the compositions K to O at 580 nm, wherein the absorption values at minute 0 were set with 100% and the further measurement results of the examination were correlated accordingly (mean value of three independent measurements).

| Measurement time | Composition | | | | |
|---|---|---|---|---|---|
| point [min] | K | L | M | N | O |
| 0 | 100% | 100% | 100% | 100% | 100% |
| 5 | 97.2% | 99.7% | 90.4% | 91.7% | 92.6% |
| 10 | 96.4% | 96.6% | 79.6% | 86.6% | 89.3% |
| 15 | 93.9% | 95.4% | 71.3% | 78.9% | 75.9% |
| 20 | 92.7% | 94.3% | 66.5% | 67.0% | 64.7% |
| 25 | 89.0% | 91.9% | 59.3% | 56.3% | 52.6% |
| 30 | 86.3% | 87.8% | 52.1% | 49.4% | 46.5% |
| 40 | 85.1% | 84.0% | 43.1% | 43.9% | 43.5% |
| 50 | 84.3% | 82.5% | 36.7% | 32.5% | 31.1% |
| 60 | 82.8% | 79.2% | 30.6% | 28.6% | 26.0% |

The results of the absorption measurements clearly and impressively show that a particular group of organic phosphonates is able to provide relatively stable potassium manganate solutions. The use of organic phosphonates having organic groups with heteroatoms led to the potassium permanganate being reduced more rapidly.

TABLE D

Absorption of the comparative compositions 1 to 5 at 580 nm, wherein the absorption values at minute 0 were set with 100% and the further measurement results of the examination were correlated accordingly (mean value of three independent measurements).

| Measurement time | Composition | | | | |
|---|---|---|---|---|---|
| point [min] | 1 | 2 | 3 | 4 | 5 |
| 0 | 100% | 100% | 100% | 100% | 100% |
| 5 | 90.1% | 91.2% | 70.4% | 73.1% | 72.8% |
| 10 | 87.2% | 89.8% | 67.5% | 69.4% | 69.1% |
| 15 | 86.1% | 88.2% | 63.2% | 65.7% | 67.0% |
| 20 | 84.9% | 85.7% | 61.4% | 62.9% | 61.9% |
| 25 | 81.7% | 80.2% | 58.9% | 56.4% | 58.5% |
| 30 | 77.1% | 76.3% | 54.2% | 50.5% | 53.6% |
| 40 | 74.2% | 74.7% | 49.9% | 46.3% | 48.8% |
| 50 | 71.6% | 70.5% | 38.7% | 39.2% | 36.7% |
| 60 | 65.8% | 67.1% | 32.1% | 33.5% | 31.1% |

The results of the absorption measurements confirm that the use of an alternative oxidizing agent instead of persulphate (i.e. hydrogen peroxide) leads to a reduced stability of the potassium permanganate. This means that the use of persulphates led, compared to the use of other oxidizing agents, to a stabilization of the permanganate.

The invention claimed is:

1. A composition for cleaning surfaces and/or for detecting organic substances in a solution or on a surface, consisting essentially of:

a) at least one alkali salt selected from the group consisting of potassium permanganate, potassium ferrate, potassium dichromate and combinations thereof b) at least one organic phosphonate, c) at least one persulphate, and d) at least one alkali hydroxide, wherein the at least one organic phosphonate is selected from the group consisting of 1-hydroxy ethane-(1,1-diphosphonic acid), 2-phosphono-butane-1,2,4-tricarboxylic acid, and a salt thereof.

2. The composition according to claim 1, wherein the at least one persulphate is a salt of peroxo-disulphuric acid or of peroxo-mono-sulphuric acid.

3. The composition according to claim 1, wherein the at least one persulphate is selected from the group consisting of sodium peroxo-disulphate, potassium peroxo-disulphate, ammonium peroxo-disulphate, potassium peroxo-monosulphate, and combinations thereof.

4. A composition for cleaning surfaces and/or for detecting organic substances in a solution or on a surface, consisting essentially of:

a) at least one alkali salt selected from the group consisting of potassium permanganate, potassium ferrate, potassium dichromate and combinations thereof b) at least one organic phosphonate, c) at least one persulphate, d) at least one alkali hydroxide, and e) at least one calcium salt, wherein the at least one organic phosphonate is selected from the group consisting of 1-hydroxy ethane-(1,1-diphosphonic acid), 2-phosphono-butane-1,2,4-tricarboxylic acid, and a salt thereof.

5. The composition according to claim 1, wherein the composition comprises the at least one potassium permanganate, potassium ferrate, or potassium dichromate at a weight ratio to the at least one organic phosphonate of 1:50 to 1:500.

6. The composition according to claim 1, wherein the composition is an aqueous composition.

7. The composition according to claim 6, wherein the composition comprises more than 50% by weight, water.

8. The composition according to claim 6, wherein the aqueous composition further comprises 0.1% by weight to 2% by weight, of at least one further oxidizing agent.

9. The composition according to claim 6, wherein the aqueous composition comprises 0.01% by weight to 1% by weight, of the at least one organic phosphonate.

10. The composition according to claim 4, wherein the composition comprises 0.1% by weight to 3% by weight, of the at least one calcium salt.

11. The composition according to claim 1, wherein the composition is substantially free of water.

12. The composition according to claim 1, wherein the composition comprises less than 20% by weight, water.

13. The composition according to claim 1, wherein the at least one alkali hydroxide is NaOH, KOH or LiOH.

14. The composition according to claim 6, wherein the aqueous composition comprises 0.1% by weight to 5% by weight, of the at least one alkali hydroxide.

* * * * *